United States Patent
Yoon

[11] Patent Number: 5,986,821
[45] Date of Patent: Nov. 16, 1999

[54] TWO LENS GROUP ZOOM LENS SYSTEM WITH A HIGH ZOOMING RATIO

[75] Inventor: Yong-gyu Yoon, Changwon-si, Rep. of Korea

[73] Assignee: Samsung Aerospace Industries Ltd., Rep. of Korea

[21] Appl. No.: 09/023,770

[22] Filed: Feb. 13, 1998

[30] Foreign Application Priority Data

Feb. 14, 1997 [KR] Rep. of Korea .......................... 97-4498

[51] Int. Cl.$^6$ .................................. G02B 15/14
[52] U.S. Cl. ........................................ 359/692; 359/691
[58] Field of Search ..................... 359/686–692

[56] References Cited

U.S. PATENT DOCUMENTS

| | | | |
|---|---|---|---|
| 5,398,135 | 3/1995 | Ohashi | 389/692 |
| 5,481,404 | 1/1996 | Kikushi | 359/674 |
| 5,636,061 | 6/1997 | Kang | 359/692 |
| 5,687,027 | 11/1997 | Itoh | 359/692 |
| 5,726,811 | 3/1998 | Kang | 359/692 |

FOREIGN PATENT DOCUMENTS

| | | |
|---|---|---|
| 52-52111 | 4/1977 | Japan . |
| 3-260610 | 11/1991 | Japan . |
| 4-93810 | 3/1992 | Japan . |
| 6-88941 | 3/1994 | Japan . |
| 6-186748 | 7/1994 | Japan . |
| 7-234363 | 9/1995 | Japan . |

*Primary Examiner*—Georgia Epps
*Assistant Examiner*—Michael A Lucas
*Attorney, Agent, or Firm*—Powrey & Simon

[57] ABSTRACT

A zoom lens system having two lens group. The zoom lens system has a zooming ratio greater than 2.4, a viewing angle of over 70 degrees and a telephoto ratio of about 1.0. The zoom lens system includes a first lens group of a positive refractive power, which has four lenses, and a second lens group of a negative refractive power, which has three lenses. The second lens group includes one aspherical lens surface. The zoom lens system according to the present invention satisfies the following conditions:

$0.22 < fl/ft < 0.30$ $2.45 < ft/fw$ $0.74 < Ll1/(ft-fw) < 0.85$ $0.75 < fl/Y < 1.10$ where
  fl is a focal length of a first lens group;
  ft is a focal length of the entire zoom lens system at a telephoto position;
  fw is a focal length of the entire zoom lens system at a wide angle position;
  Ll1 is a shift distance of the first lens group during zooming; and
  2Y is a diagonal length of an image.

10 Claims, 24 Drawing Sheets

Wide Angle Position

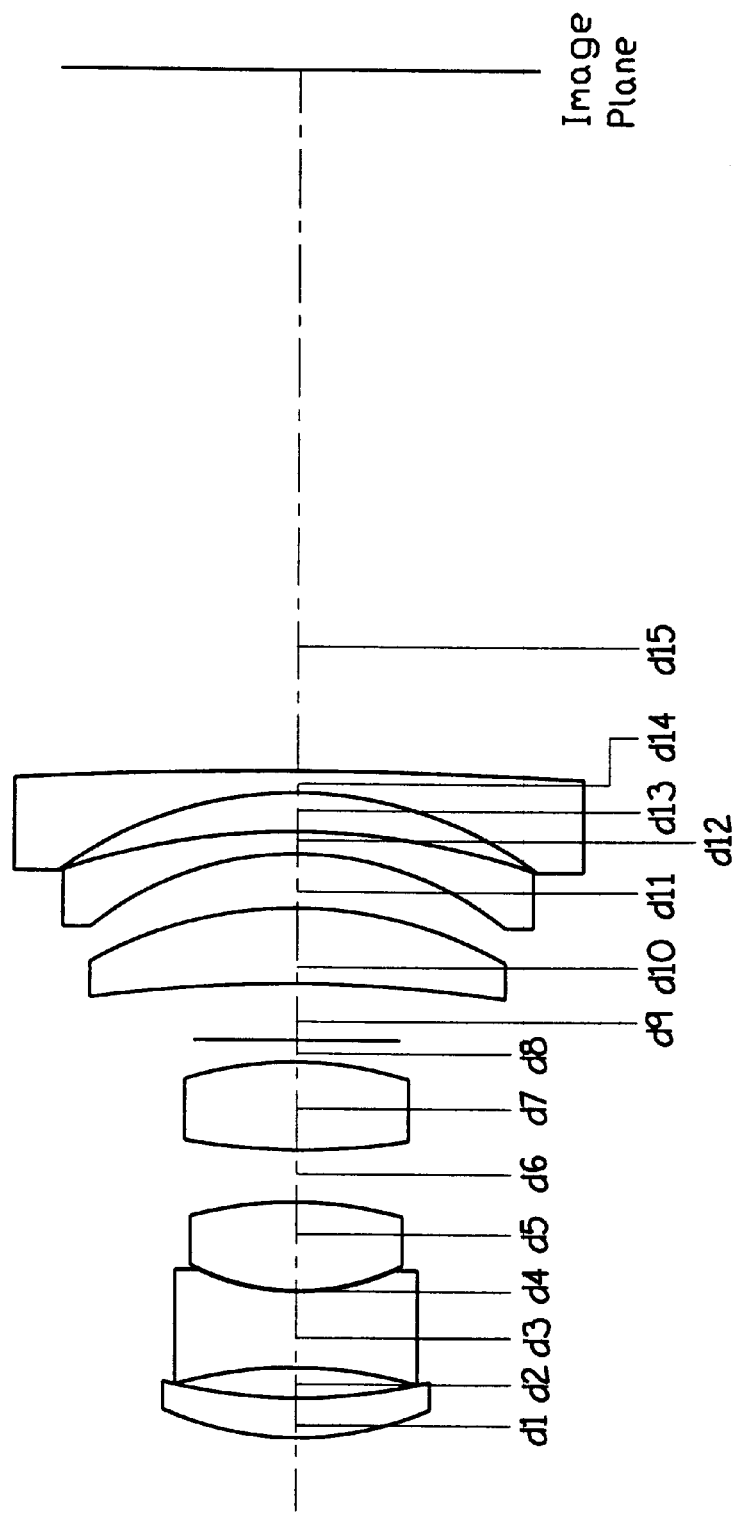

Chromatic Aberration
$F_{NO} = 11.14$

-0.2    0.2

Astigmatism
$\theta/2 = 15.6°$ $\theta$ : Half Viewing Angle

-0.2    0.2

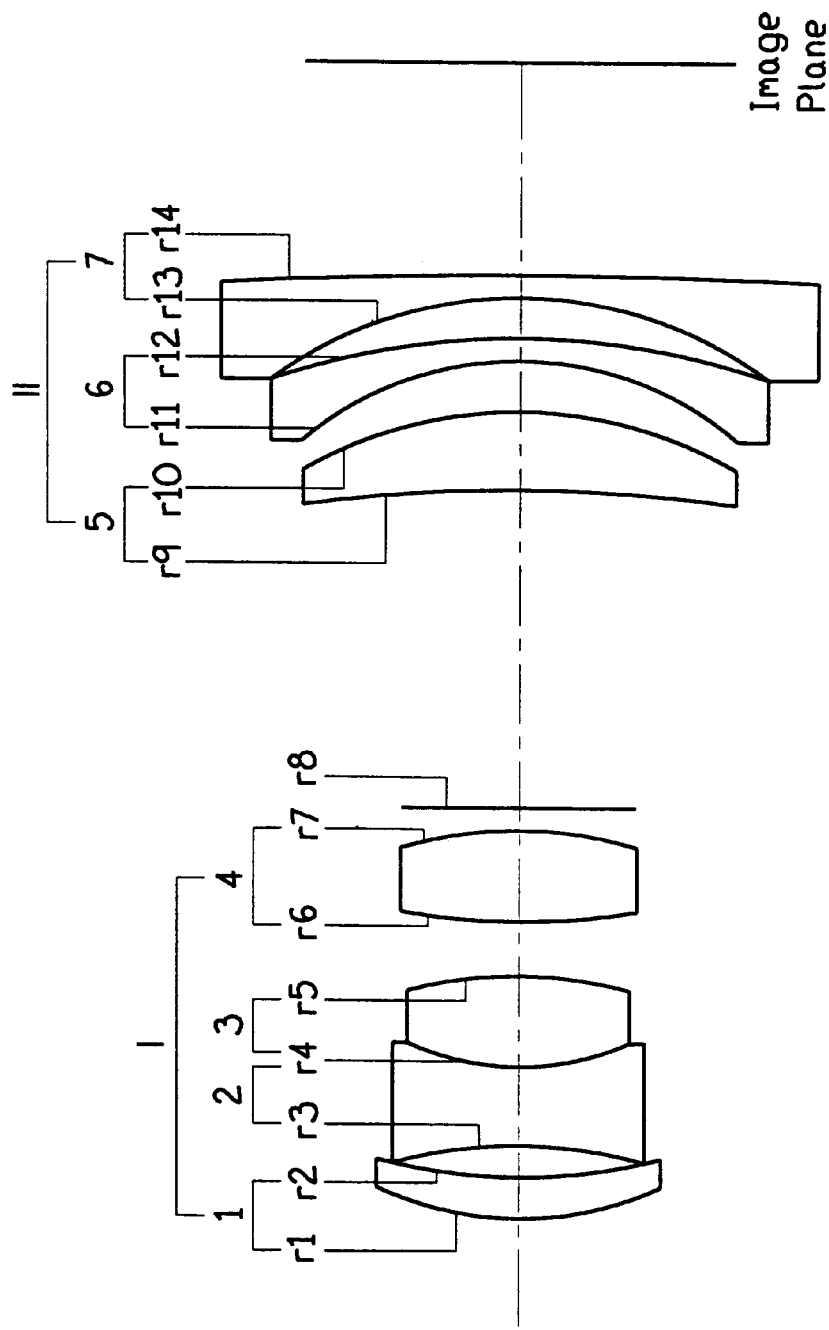
FIG.4A Wide Angle Position

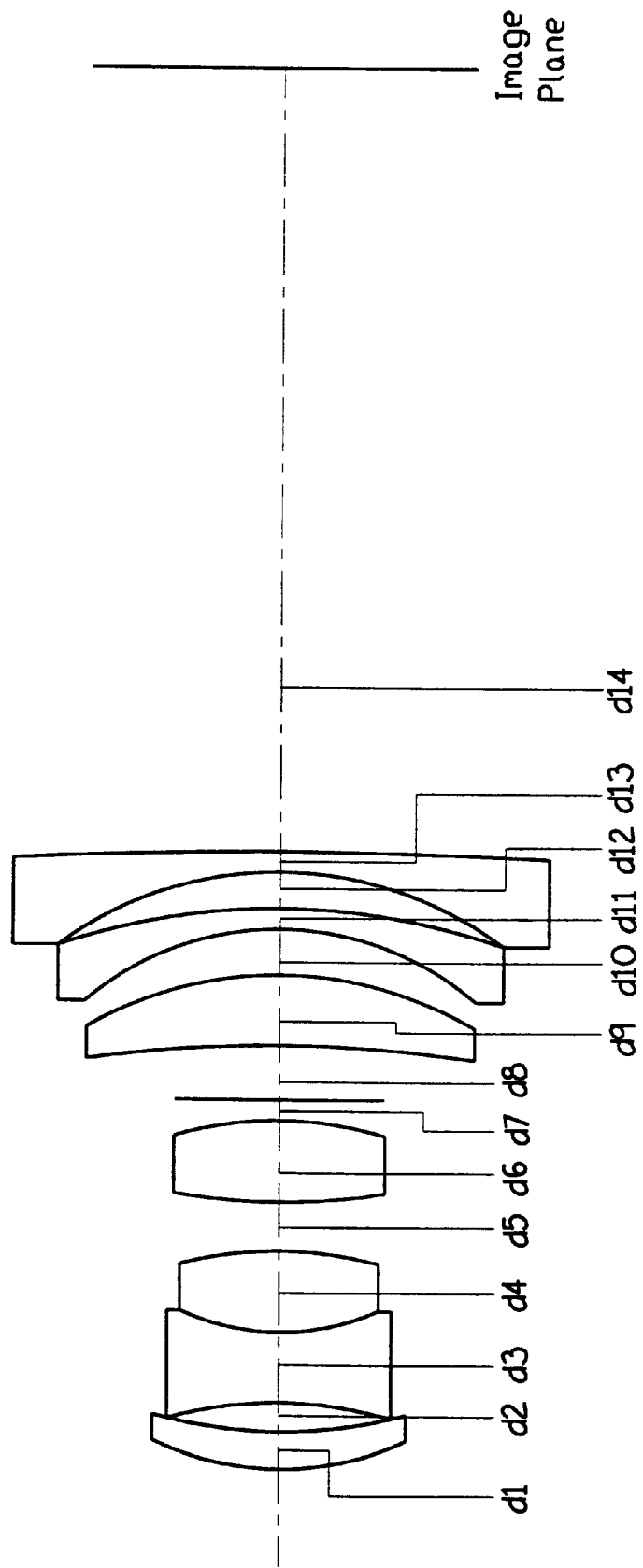
FIG. 4B Telephoto Position

Chromatic Aberration $F_{NO}$=4.17

-0.2   0.2

Astigmatism $\theta/2$ =36.72°

$\theta$ : Half Viewing Angle

-0.2   0.2

Chromatic Aberration

F_NO =11.14

-0.2  0.2

Astigmatism

θ/2= 15.6°

θ : Half Viewing Angle

-0.2  0.2

Chromatic Aberration
F$_{NO}$=4.18

-0.2    0.2

Astigmatism
θ/2=36.72°

θ : Half Viewing Angle

-0.2    0.2

Chromatic Aberration $F_{NO} = 11.17$

-0.2   0.2

Astigmatism $\theta/2 = 15.6°$ $\theta$ : Half Viewing Angle

-0.2   0.2

Chromatic Aberration

F_NO = 4.3

-0.2  0.2

Astigmatism $\theta/2 = 37.68°$ $\theta$ : Half Viewing Angle

-0.2  0.2

Chromatic Aberration $F_{NO} = 10.75$

-0.2   0.2

Astigmatism $\theta/2 = 17.2°$ $\theta$ : Half Viewing Angle

-0.2   0.2

Chromatic Aberration
$F_{NO}=4.17$
-0.2   0.2

Astigmatism
$\theta/2 = 36.72\%$
$\theta$ : Half Viewing Angle
-0.2   0.2

Chromatic Aberration $F_{NO} = 11.14$

-0.2   0.2

Astigmatism $\theta/2 = 15.6°$ $\theta$ : Half Viewing Angle

-0.2   0.2

TWO LENS GROUP ZOOM LENS SYSTEM WITH A HIGH ZOOMING RATIO

BACKGROUND OF THE INVENTION (a) Field of the Invention

The present invention relates to a zoom lens system for a camera and, more particularly, to a zoom lens system having a first lens group of four lenses and a second lens group of three lenses, one of which is an aspherical lens.

(b) Description of the Related Art

Generally, zoom lens systems for compact cameras are divided into two types: those having two lens groups and those having three lens groups. The two lens group type is compact and lightweight, but does not provide a zooming ratio greater than 2.0 without using an aspherical lens.

Using an aspherical lens, it is possible to obtain a zooming ratio as great as 2.4. In order to obtain a zooming ratio higher than 2.4, it is necessary to use more lenses or reduce an effective diameter of the lenses in order to obtain high quality images. If a zoom lens system has more lenses, the total length of the system increases so that a telephoto ratio of the system also increases to more than 1.0. It becomes difficult to achieve a compact zoom lens system.

Because a two lens group type zoom lens system for a compact camera generally has a focal length of 35–39 mm, a viewing angle becomes about 63.4–59.0 degrees for a general Leica size image plane (24×36 mm). As a viewing angle increases, it becomes more difficult to correct aberrations over the entire zoom lens system.

In order to overcome the above drawbacks, zoom lens systems having two lens groups are disclosed in Japanese Patent Application Laid-open Publications Nos. Hei 3-260610, Hei 4-93810, Hei 7-234363 and Sho 52-52111. The zoom lens systems disclosed in the above prior art documents comprise a first lens group of a positive refractive power and a second lens group of a negative refractive power. The focal length of the system depends on the distance between the first lens group and the second lens group. Each of these prior art zoom lens systems has a zooming ratio less than 2.4 and uses one or more aspherical lenses.

The zoom lens system of Hei 7-234363 has an ultra wide viewing angle of more than 70 degrees while the other zoom lens systems have viewing angles less than 65 degrees.

These prior art zoom lens systems also have telephoto ratios greater than 1.0.

Therefore, a zoom lens system with a high zooming ratio and a wide viewing angle has more lenses than a system with a zooming ratio less than 2.4 and a viewing angle less than 70 degrees. As a result, it is difficult to reduce the size of the system, making it difficult to obtain a telephoto ratio below 1.0.

SUMMARY OF THE INVENTION

In view of the prior art described above, it is an object of the present invention to provide a zoom lens system comprising two lens groups, which has a zooming ratio greater than 2.4, a viewing angle of over 70 degrees, and a telephoto ratio of about 1.0.

It is another object of the present invention to provide a zoom lens system with optical characteristics to correct aberrations over the entire zooming range.

To achieve these and other objects, as embodied and broadly described herein, the invention includes:

a first lens group of a positive refractive power comprising
- a first lens of a positive refractive power which is a meniscus lens convex toward the object,
- a second lens of a negative refractive power which is a double concave lens,
- a third lens of a positive refractive power which is a double convex lens, and
- a fourth lens of a positive refractive power which is a double convex lens, and a second lens group of a negative refractive power comprising
- a fifth lens of a positive refractive power which is a meniscus lens convex toward an image plane,
- a sixth lens of a negative refractive power which is a meniscus lens convex toward the image plane, and
- a seventh lens of a negative refractive power which is a meniscus lens convex toward the image plane.

The second lens group includes one aspherical lens surface. The zoom lens system according to the present invention satisfies the following conditions:

$$0.22 < fl/ft < 0.30$$
$$2.45 < ft/fw$$
$$0.74 < Ll1/(ft-fw) < 0.85$$
$$0.75 < fl/Y < 1.10$$

where fl is a focal length of a first lens group;

ft is a focal length of the entire zoom lens system at a telephoto position;

fw is a focal length of the entire zoom lens system at a wide angle position;

Ll1 is a shift distance of the first lens group during zooming; and 2Y is a diagonal length of an image.

Both foregoing general description and the following detailed description are exemplary and are intended to provide further explanation of the invention as claimed.

BRIEF DESCRIPTION OF THE DRAWINGS

The accompanying drawings provide a further understanding of the invention and, together with the Detailed Description, explain the principles of the invention. In the drawings:

FIGS. 1A and 1B are sectional views of a zoom lens system at a wide angle position and a telephoto position, respectively, according to first, third, fourth and fifth preferred embodiments of the present invention;

FIGS. 4A and 4B are sectional views of a zoom lens system at a wide angle position and a telephoto position, respectively, according to a second preferred embodiment of the present invention;

DETAILED DESCRIPTION OF THE PREFERRED EMBODIMENTS

A zoom lens system in accordance with the present invention will be described in detail with reference to the accompanying drawings.

Figure 1A:
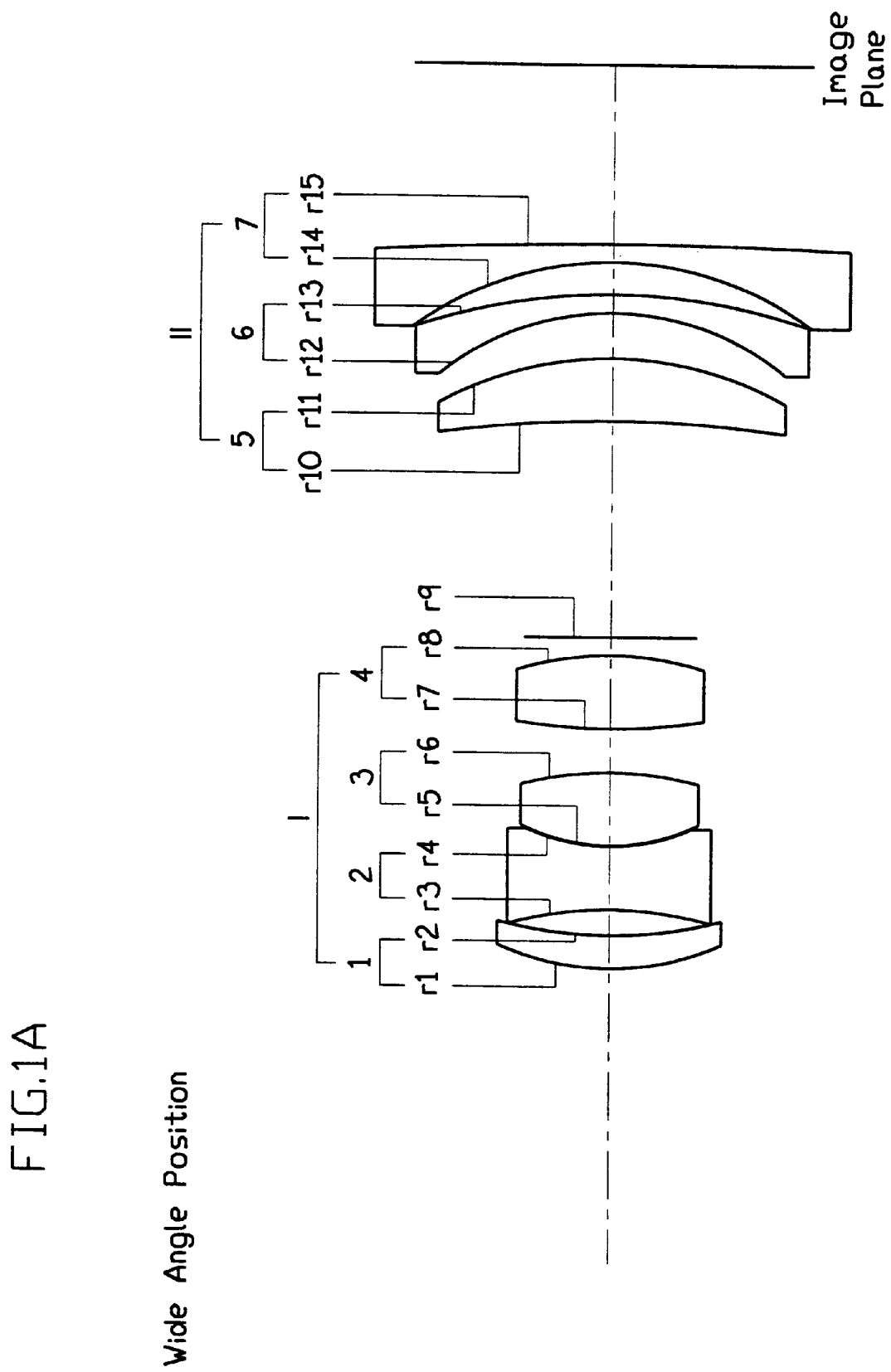
Figure 2A:
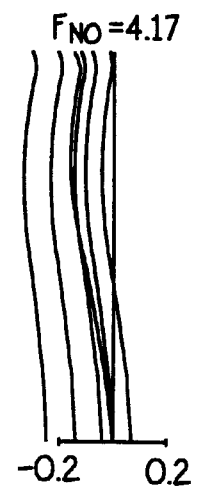
FIGS. 2A, 2B and 2C illustrate the aberration curves of a zoom lens system at a wide angle position, according to the first preferred embodiment of the present invention.
Figure 2B:
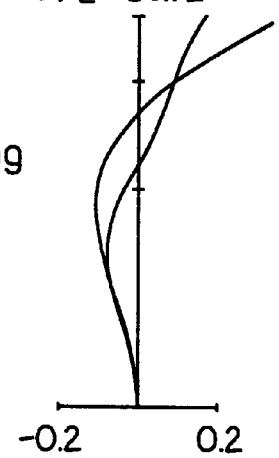
Figure 2C:
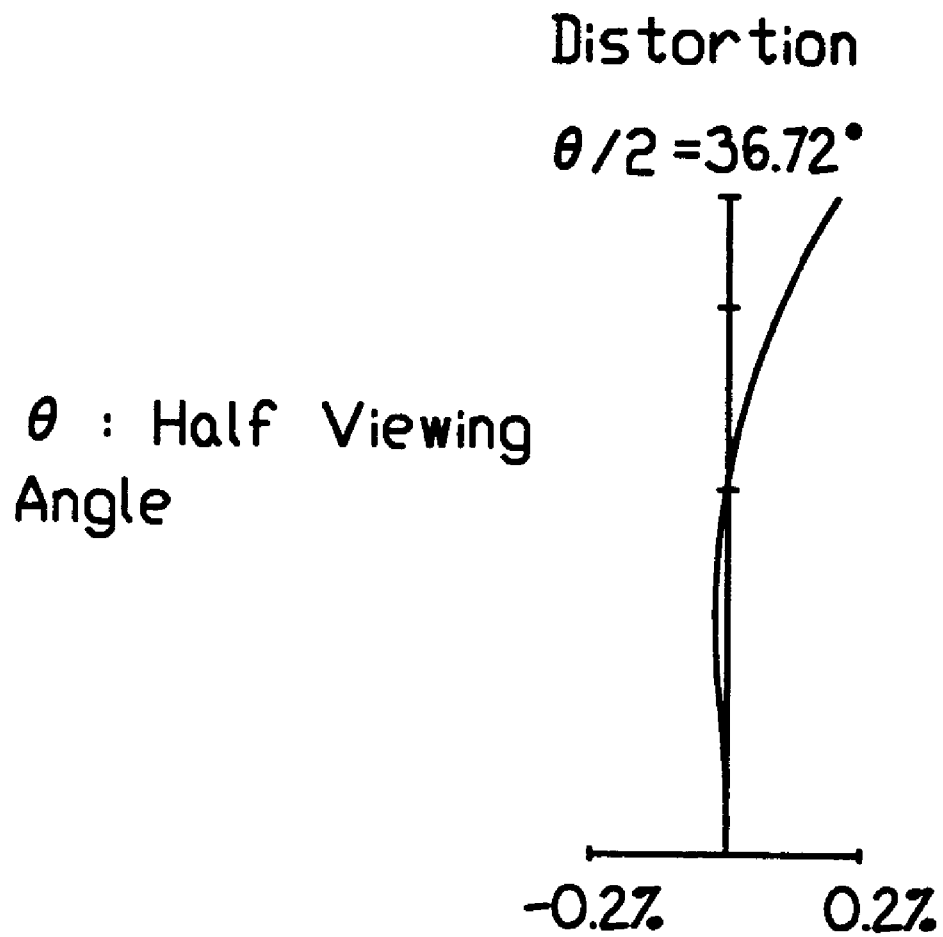
Figure 3A:
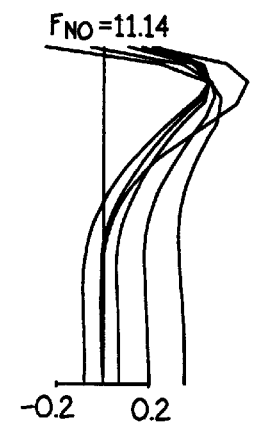
FIGS. 3A, 3B and 3C illustrate the aberration curves of a zoom lens system at a telephoto position, according to the first preferred embodiment of the present invention.
Figure 3B:
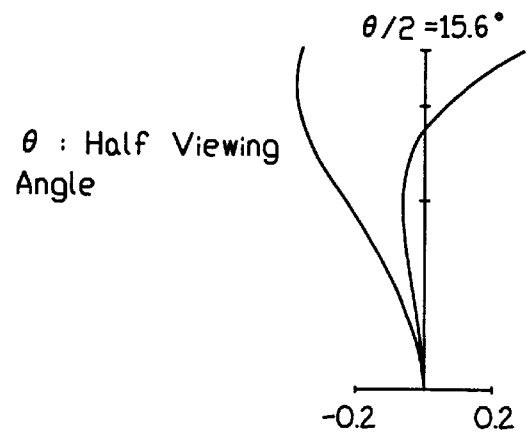
Figure 3C:
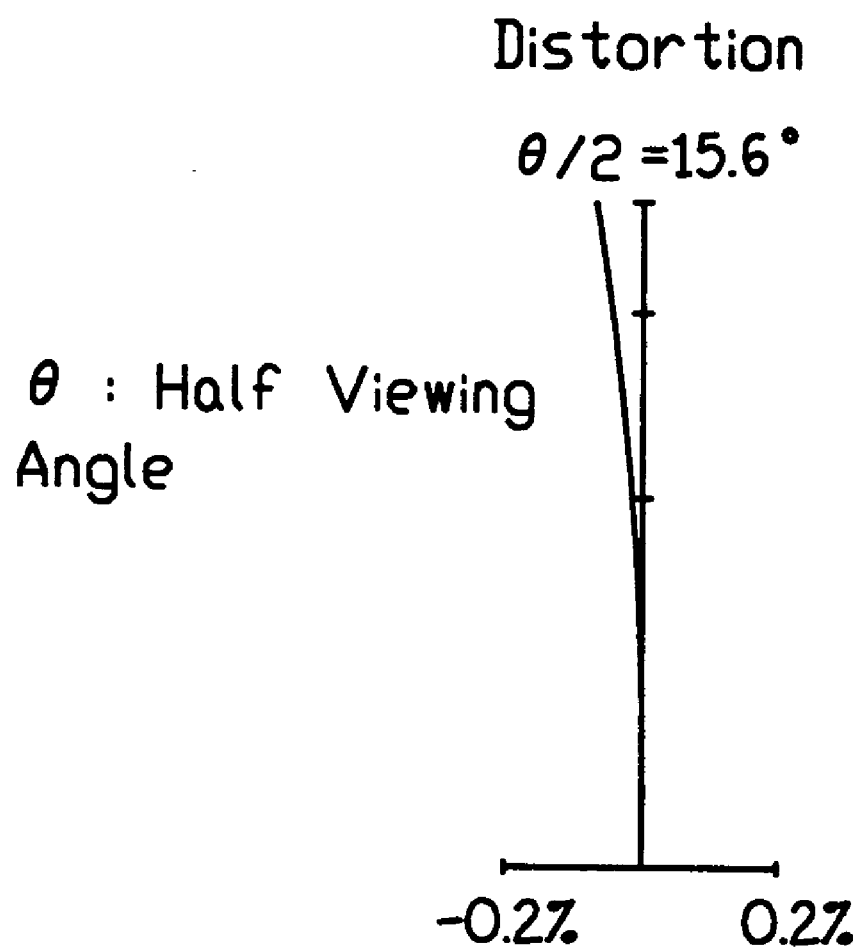
Figure 5A:
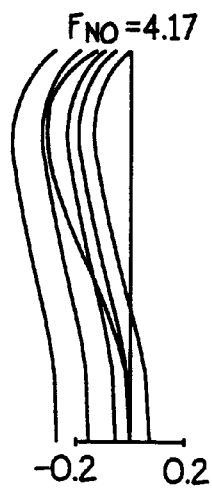
FIGS. 5A, 5B and 5C illustrate the aberration curves of a zoom lens system at a wide angle position, according to the second preferred embodiment of the present invention.
Figure 5B:
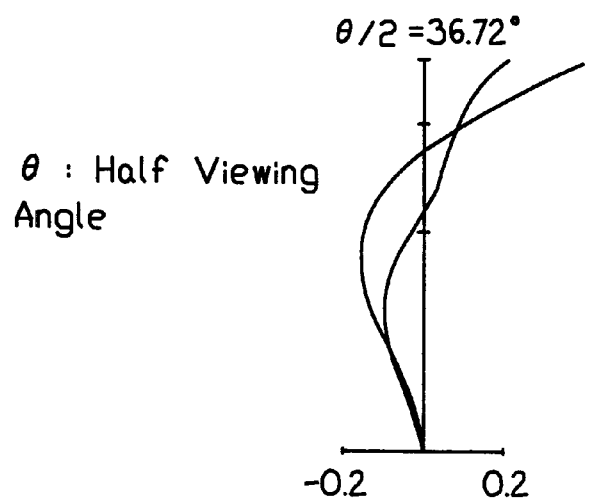
Figure 5C:
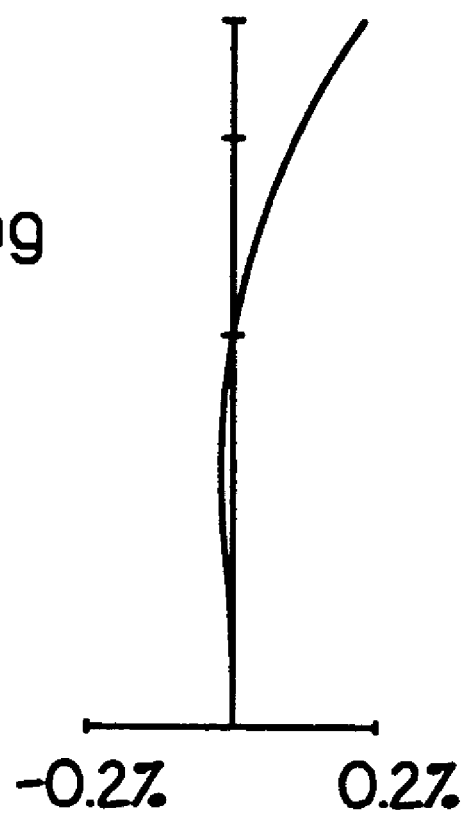
Figure 6A:
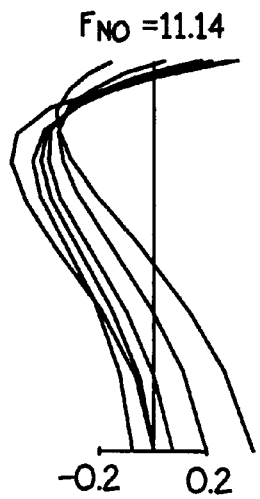
FIGS. 6A, 6B and 6C illustrate the aberration curves of a zoom lens system at a telephoto position, according to the second preferred embodiment of the present invention.
Figure 6B:
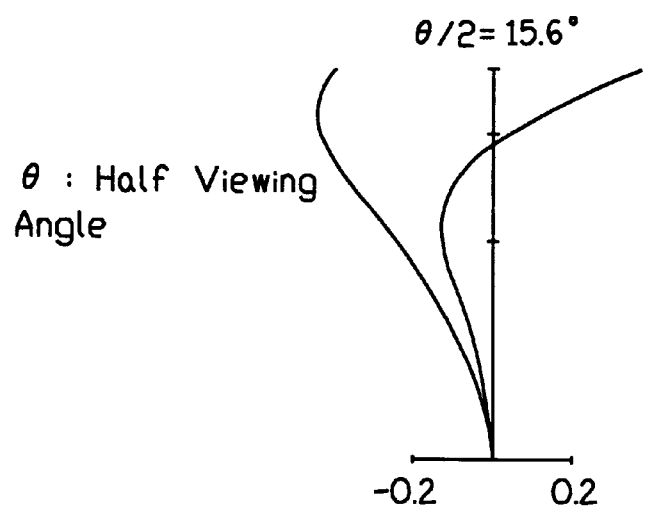
Figure 6C:
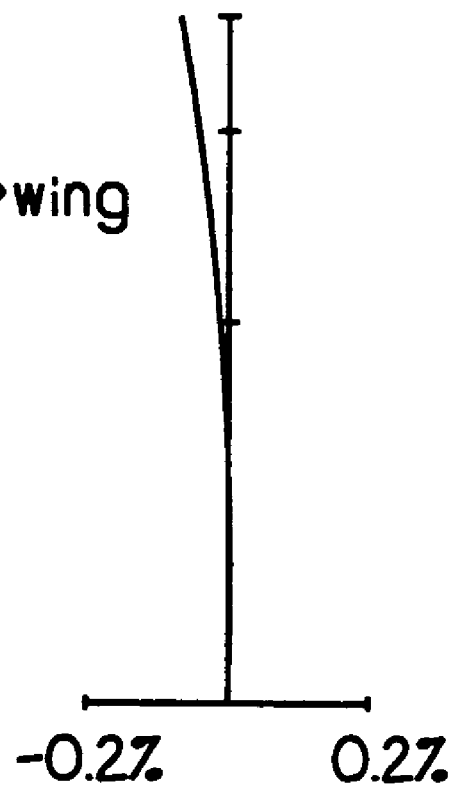
Figure 7A:
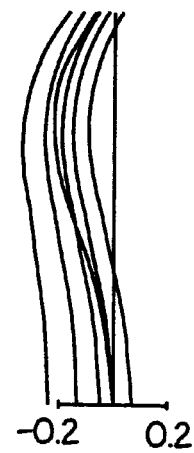
FIGS. 7A, 7B and 7C illustrate the aberration curves of a zoom lens system at a wide angle position, according to the third preferred embodiment of the present invention.
Figure 7B:
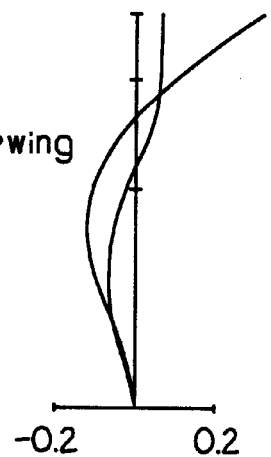
Figure 7C:
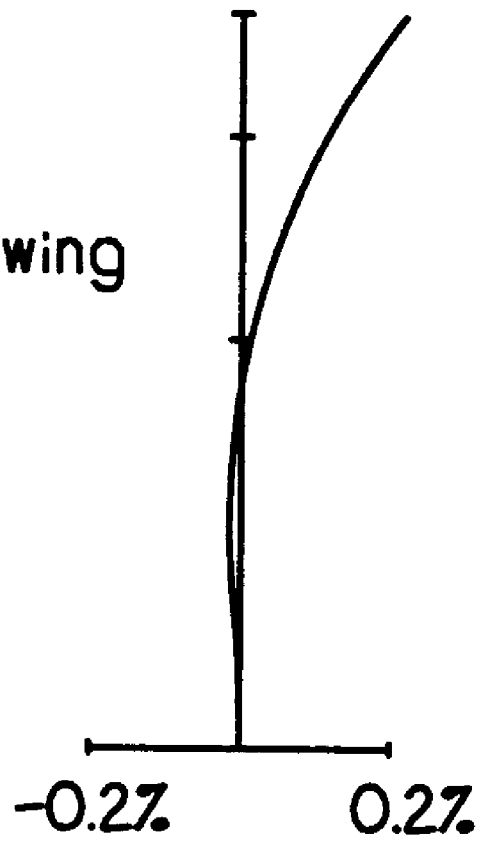
Figure 8A:
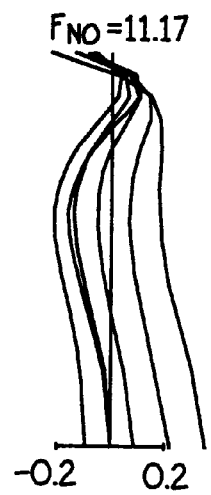
FIGS. 8A, 8B and 8C illustrate the aberration curves of a zoom lens system at a telephoto position, according to the third preferred embodiment of the present invention.
Figure 8B:
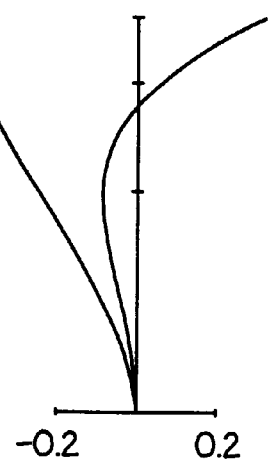
Figure 8C:
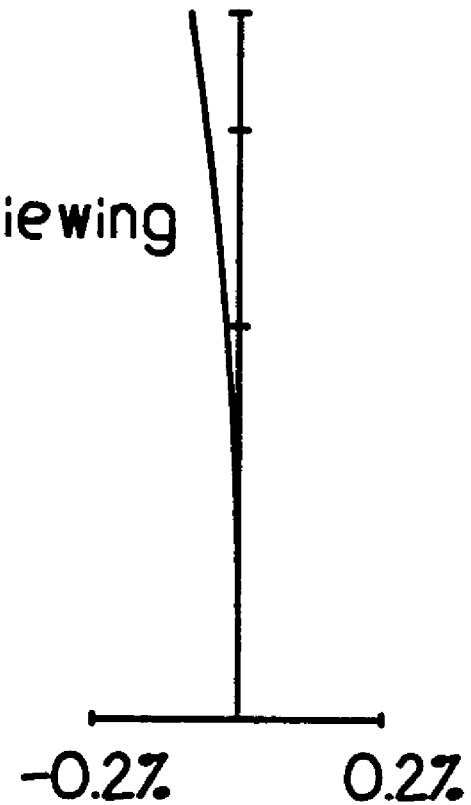
Figure 9A:
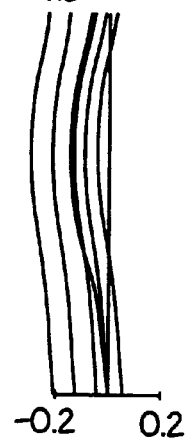
FIGS. 9A, 9B and 9C illustrate the aberration curves of a zoom lens system at a wide angle position, according to the fourth preferred embodiment of the present invention.
Figure 9B:
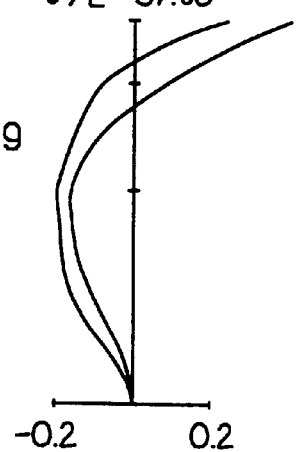
Figure 9C:
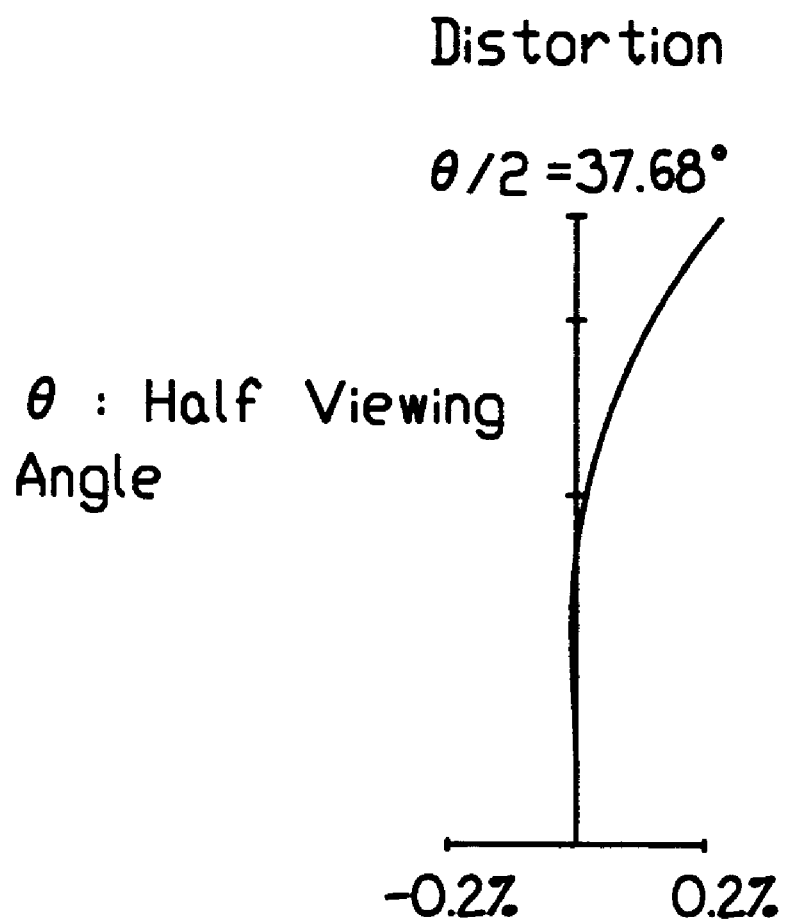
Figure 10A:
FIGS. 10A, 10B and 10C illustrate the aberration curves of a zoom lens system at a telephoto position, according to the fourth preferred embodiment of the present invention.
Figure 10B:
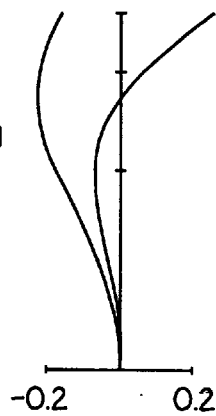
Figure 10C:
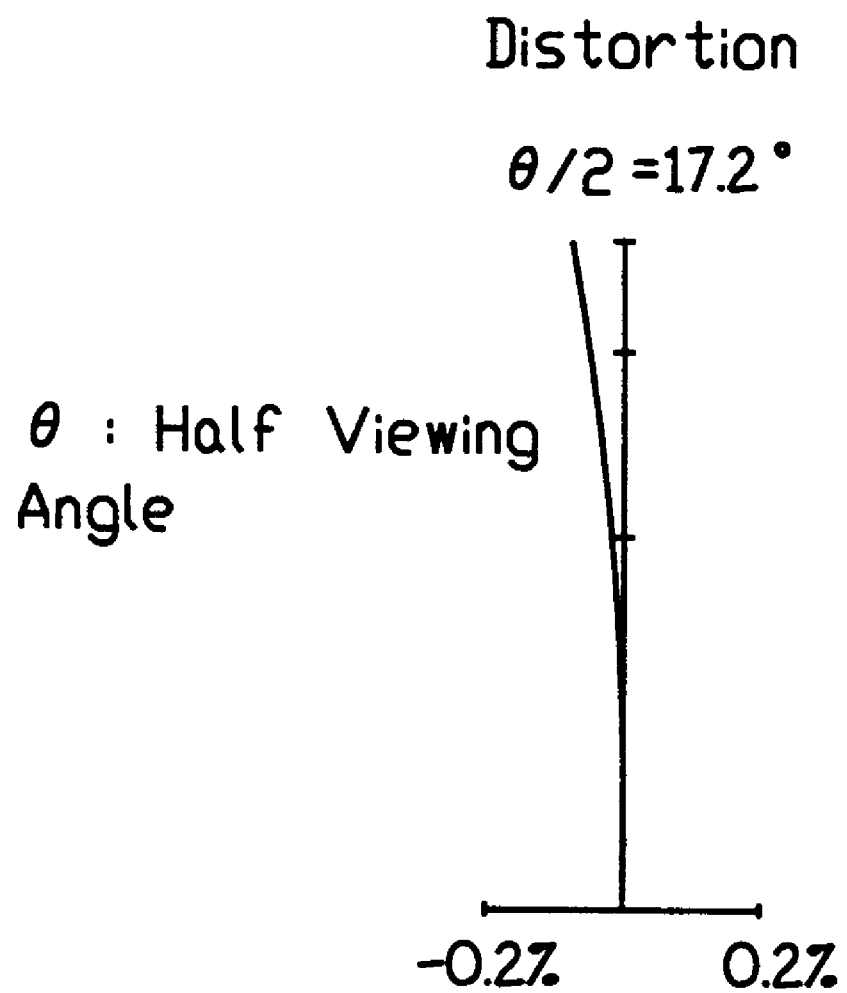
Figure 11A:
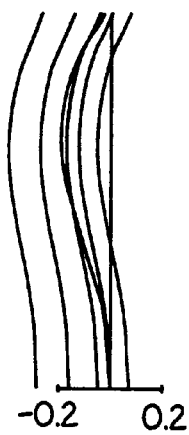
FIGS. 11A, 11B and 11C illustrate the aberration curves of a zoom lens system at a wide angle position, according to the fifth preferred embodiment of the present invention.
Figure 11B:
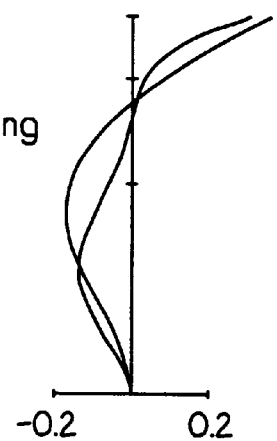
Figure 11C:
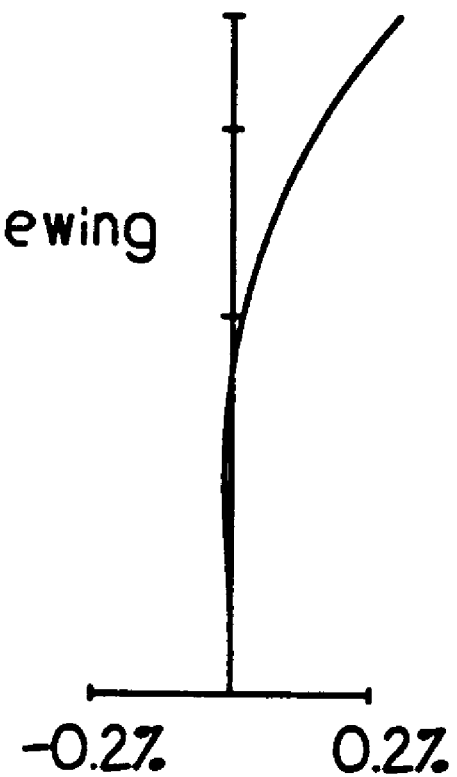
Figure 12A:
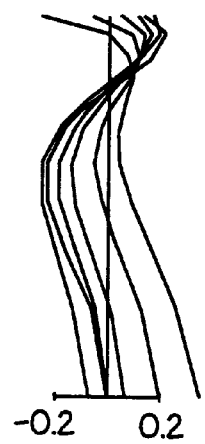
FIGS. 12A, 12B and 12C illustrate the aberration curves of a zoom lens system at a telephoto position, according to the fifth preferred embodiment of the present invention.
Figure 12B:
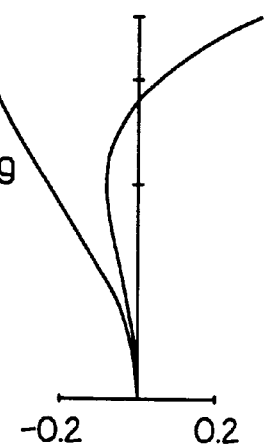
Figure 12C:
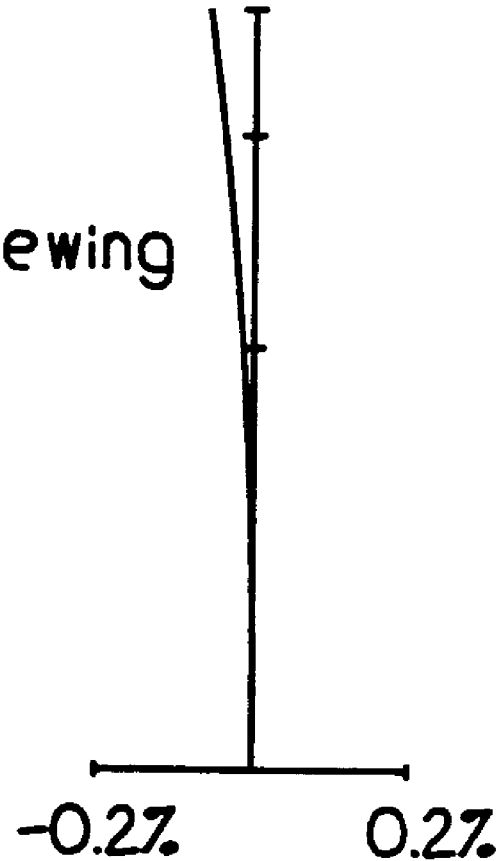

As shown in FIGS. 1A–1B and 4A–4B, preferred embodiments according to the present invention provide a zoom lens system. In first, third, fourth and fifth preferred embodiments, the zoom lens system comprises a first lens group I and a second lens group II and a diaphragm r9 formed between the two lens groups I and II, as shown in FIGS. 1A–1B. In a second preferred embodiment the zoom lens system comprises a first lens group I and a second lens group II and a diaphragm r8 formed between the two lens groups I and II, as shown in FIGS. 4A–4B.

The first lens group I, having a positive refractive power, includes four lenses. A first lens 1 has a positive refractive power and is a meniscus lens convex toward the object. A second lens 2 which is a double concave lens has a negative refractive power, while a third lens 3 and a fourth lens 4 have positive refractive powers, and are double convex lenses.

The second lens group II, having a negative refractive power, includes three lenses. A fifth lens 5 has a positive refractive power, and is a meniscus lens convex toward an image plane. A sixth lens 6 and a seventh lens 7 are meniscus lenses convex toward the image plane, each having a negative refractive power. One of the lenses 5 to 7 of second lens group II has an aspherical lens surface.

While zooming, the first lens group I moves along with the diaphragm r9 in the first, third, fourth and fifth preferred embodiments or r8 in the second embodiment so that the entire length of the zoom lens system is shortened. The present invention achieves a system with a viewing angle wider than 70 degrees and makes it possible to correct aberrations when a zooming ratio is more than 2.4 and thus achieves high quality optical characteristics throughout the entire zooming range.

In order to obtain such optical characteristics, the first lens 1 of the first lens group I has a convex surface shape toward an object and the second lens 2 of the first lens group I has a double concave surface shape. It is also provided with an aspherical surface in the second lens group II.

The zoom lens system according to the present invention satisfies the following conditions:

$$0.22 < fl/ft < 0.30 \tag{1}$$

$$2.45 < ft/fw \tag{2}$$

$$0.74 < Ll1/(ft-fw) < 0.85 \tag{3}$$

$$0.75 < fl/Y < 1.10 \tag{4}$$

$$1.30 < Lw/fw < 1.50 \tag{5}$$

$$2.30 < fl/fbw < 2.60 \tag{6}$$

$$0.67 < fl/fw < 0.73 \tag{7}$$

$$2.50 < ft/f5 < 3.10 \tag{8}$$

$$3.3 < \beta t < 4.0 \tag{9}$$

$$0.90 < Lt/ft < 1.10 \tag{10}$$

where:

ft is a focal length of the entire zoom lens system at a telephoto position;

fw is a focal length of the entire zoom lens system at a wide angle position;

fl is a focal length of a first lens group I;

Ll1 is a shift distance of the first lens group I during zooming;

2Y is a diagonal length of an image;

Lw is a distance of an optical axis between an entrance surface of the first lens 1 and an image plane at a wide angle position;

βt is a lateral magnification ratio of the second lens group II at a telephoto position;

Lt is a distance of an optical axis between an entrance surface of the first lens 1 and an image plane at a telephoto position;

fbw is a back focal length of the entire zoom lens system at a wide angle position; and f5 is a focal length of the fifth lens 5.

Condition (1) relates to a focal length of the first lens group I and a focal length of the entire zoom lens system. If condition (1) exceeds the upper limit, the shift distance of the first lens group I while zooming increases. This results in a large size zoom lens system and makes it difficult to obtain a compact zoom lens system. If condition (1) goes below the lower limit, the deviation of the image plane increases depending on the position of the first lens group I. This requires complex lens holding mounts of high precision.

Condition (2) relates to a zooming ratio. It is desirable to increase the value of ft/fw in condition (2) in order to obtain a high zooming ratio. A focal length of the entire zoom lens system needs to be increased in order to obtain a higher value of ft/fw in condition (2). A focal length of the entire zoom lens system is generally described as follows:

$$f = fl \times mll$$

where f is a focal length of an entire lens system;

fl is a focal length of a first lens group; and mll is a lateral magnification ratio of a second lens group.

As the above formula indicates, either or both of fl and mll need to be increased to achieve a longer focal length of an entire lens system. As fl is increased, the refractive power of the first lens group I decreases which makes it difficult to obtain a compact zoom lens system. As mll is increased, the negative refractive power of the zoom lens system also increases, making it difficult to correct aberrations.

Condition (3) relates to a zoom stroke of the first lens group I. The zoom stroke represents a shift distance of a lens group from a wide angle position to a telephoto position. If the upper limit is exceeded in condition (3), the zoom stroke of the first lens group I becomes too long. This causes the distance between the first lens 1 and the image plane at a telephoto position to become long. If condition (3) goes below the lower limit, the refractive power of the first lens group I becomes too large. This, in turn, will increase aberrations when zooming.

Condition (4) defines a proper focal length of the first lens group I. The present invention allows a shorter focal length at a wide angle position by reducing the focal length of the first lens group. If the upper limit of condition (4) is exceeded, it is difficult to obtain a viewing angle wider than 70 degrees. In order to obtain a short combined focal length of the first lens group I and the second lens group II, the distance between the first lens group and the second lens group should be long. This results in a back focal length which is too short and requires an increase in the diameter of the second lens group II. It also forces the lens holders to be large. If condition (4) goes below the lower limit, the combined focal length decreases so that it is possible to obtain a long back focal length. However, it is required to increase the refractive power of the first lens group I. As a result, it is difficult to correct aberrations, making it difficult to obtain high quality images.

Condition (5) relates to a ratio of a distance between the first lens 1 and the image plane to the focal length of the system at a wide angle position. Condition (5) may thus be used to achieve a compact system as well as high quality optical characteristics. If the upper limit of condition (5) is exceeded, the distance between the first lens 1 and the image plane increases. Thus, it is difficult to obtain a compact zoom lens system. If condition (5) goes below the lower limit, the distance between the first lens 1 and the image plane decreases, making it easy to obtain a compact zoom lens system. However, the respective refractive power of each lens group I and II increases so that it is difficult to correct aberrations.

Condition (6) relates to a refractive power of the first lens group I as well as correction of aberrations over the entire zooming range. If the upper limit of condition (6) is exceeded, the refractive power of the first lens group I decreases so that the back focal length of the first lens group I becomes short at a wide angle position. This causes the diameter of the second lens group II to increase. If condition (6) goes below the lower limit, the refractive power of the first lens group I increases. This will increase aberration changes while zooming, especially spherical aberration and coma.

Condition (7) relates to the refractive power of the first lens group I. If the upper limit of condition (7) is exceeded, the refractive power of the first lens group I decreases (that is, the focal length of the first lens group increases). This causes the shift distance of the first lens group I to increase when zooming. As a result, it will be difficult to obtain a compact zoom lens system. If condition (7) goes below the lower limit, the refractive power of the first lens group I becomes so powerful that it will increase the deviation of the image plane depending on the position of the first lens group I. This requires complex lens holding mounts of high precision.

Condition (8) relates to the refractive power of the fifth lens 5 of the second lens group II. If condition (8) exceeds the upper limit, the refractive power becomes so large that it will increase an error range. If the fifth lens 5 is set to be an aspherical lens, high precision is required to manufacture the lens. If condition (8) goes below the lower limit, the refractive power decreases. This causes the refractive power of the second lens group II decreases, making it difficult to correct aberrations in the second lens group. This, in turn, will makes it difficult to correct aberrations of the entire zoom lens system.

Condition (9) relates to an optimum magnification of the second lens group II. If the upper limit of condition (9) is exceeded, the focal length of the first lens group I becomes too short to correct aberrations. If condition (9) goes below the lower limit, the back focal length of the first lens group I becomes too short and it results in large diameter lenses of the second lens group II.

Condition (10) relates to a telephoto ratio at the telephoto position and is used to obtain a compact zoom lens system. If the upper limit of condition (10) is exceeded, correction of aberrations becomes easy. However, it becomes more difficult to obtain a compact zoom lens system. If condition (10) goes below the lower limit, it is easy to obtain a compact zoom lens system but difficult to correct aberrations since the refractive power of the second lens group II increases.

Data that satisfy the above-mentioned conditions (1) to (10), according to preferred embodiments of the invention, are described in the tables below. In each of these tables, all units of length are denominated in millimeters and the following variables are used:

ri(i=1 to 15) represents a radius of curvature of a refractive surface;

di(i=1 to 15) represents a thickness of a lens or a distance between lenses;

nd represents a refractive index of a lens for d-line; and

υ represents the Abbe number of a lens.

Data for a first preferred embodiment consistent with the present invention (see FIGS. 1A and 1B) are shown in Table 1, where the viewing angle is 72 degrees, the F number (Fno) ranges from 4.17 to 11.14 and the focal length f ranges from 29.0 mm to 77.5 mm.

TABLE 1

| Surface No. | Radius of Curvature(r) | Distance(d) | Refractive Index(nd) | Abbe Number(υ) |
|---|---|---|---|---|
| 1 | 11.89149 | 1.4500 | 1.65664 | 32.32 |
| 2 | 19.70220 | 1.1168 | | |
| 3 | −16.15493 | 2.7500 | 1.83500 | 42.98 |
| 4 | 8.60360 | 0.0347 | | |
| 5 | 8.60360 | 3.2000 | 1.49700 | 81.61 |
| 6 | −14.75095 | 1.9000 | | |
| 7 | 25.68888 | 3.2000 | 1.56778 | 53.08 |
| 8 | −13.57956 | 0.8000 | | |
| 9 | Diaphragm | D1 | | |
| 10 | −52.37345 | 2.7500 | 1.77473 | 35.63 |
| 11 | −15.28631 | 1.9751 | | |
| 12* | −11.86457 | 0.8000 | 1.85000 | 41.64 |
| 13 | −26.48354 | 1.4152 | | |
| 14 | −14.59937 | 0.8000 | 1.83500 | 42.98 |
| 15 | −184.08599 | D2 | | | where * represent an aspherical surface. Variable distances D1 and D2 range from 11.00 mm to 2.1858 mm and from 8.1527 mm to 54.3600 mm, respectively, while zooming.

According to the first preferred embodiment of the present invention, the coefficient of the aspherical twelfth lens surface is described by the aspherical coefficients shown in Table 2.

TABLE 2

| | Aspherical Coefficient of the 12th Surface |
|---|---|
| A0 | −0.9988127812981E − 1 |
| A1 | 0.3119895859718E − 4 |
| A2 | −0.1913783299728E − 6 |
| A3 | 0.9522636568739E − 9 |
| A4 | 0.5660784551904E − 11 |

FIGS. 3A to 3C and 4A to 4C illustrate aberration characteristics (chromatic aberration, astigmatism and distortion) of the first preferred embodiment, at a wide angle position and a telephoto position, respectively.

Data for a second preferred embodiment of the present invention (see FIGS. 4A and 4B) are shown in Table 3, where the viewing angle is 72 degrees, the F number (Fno) ranges from 4.17 to 11.14 and the focal length f ranges from 29.0 mm to 77.5 mm. The second lens 2 of the first lens group I is attached to the third lens 3 of the first lens group I.

TABLE 3

| Surface No. | Radius of Curvature(r) | Distance(d) | Refractive Index(nd) | Abbe Number(ν) |
|---|---|---|---|---|
| 1 | 11.57596 | 1.4500 | 1.63200 | 34.14 |
| 2 | 19.13213 | 1.1161 | | |
| 3 | −15.96130 | 2.7500 | 1.83500 | 42.98 |
| 4 | 9.19032 | 3.2000 | 1.49700 | 81.61 |
| 5 | −14.82112 | 1.9000 | | |
| 6 | 24.54854 | 3.2000 | 1.57140 | 51.70 |
| 7 | −14.09705 | 0.8000 | | |
| 8 | Diaphragm | D1 | | |
| 9 | −52.01237 | 2.7500 | 1.79062 | 29.51 |
| 10 | −14.90590 | 1.7941 | | |
| 11* | −11.64993 | 0.8000 | 1.85000 | 31.29 |
| 12 | −26.47213 | 1.4372 | | |
| 13 | −14.44162 | 0.8000 | 1.83500 | 42.98 |
| 14 | −189.84079 | D2 | | | where * represent an aspherical surface. Variable distances D1 and D2 range from 10.935 mm to 2.1859 mm and from 8.1515 mm to 54.2913 mm, respectively, while zooming.

According to the second preferred embodiment of the present invention, the efficient of the aspherical eleventh lens surface is described by the aspherical coefficients shown in Table 4.

TABLE 4

| | Aspherical Coefficient of the 11th Surface |
|---|---|
| A0 | −0.1081161036346E 0 |
| A1 | 0.3532647762897E − 4 |
| A2 | −0.2919501416924E − 6 |
| A3 | 0.2930782487008E − 8 |
| A4 | −0.6681419507414E − 11 |

FIGS. 5A to 5C and 6A to 6C illustrate aberration characteristics (chromatic aberration, astigmatism and distortion) of the first preferred embodiment, at a wide angle position and a telephoto position, respectively.

Data for a third preferred embodiment of the present invention (see FIGS. 1A and 1B) are shown in Table 5, where the viewing angle is 72 degrees, the F number (Fno) ranges from 4.18 to 11.17 and the focal length f ranges from 29.0 mm to 77.5 mm.

TABLE 5

| Surafce No. | Radius of Curvature(r) | Distance(d) | Refractive Index(nd) | Abbe Number(ν) |
|---|---|---|---|---|
| 1 | 11.82961 | 1.4500 | 1.68200 | 30.61 |
| 2 | 19.19428 | 1.1129 | | |
| 3 | −16.30584 | 2.7502 | 1.83500 | 42.98 |
| 4 | 8.74664 | 0.0278 | | |
| 5 | 8.74664 | 3.2112 | 1.49700 | 81.61 |
| 6 | −14.05729 | 2.0000 | | |
| 7 | 24.79135 | 3.4000 | 1.55500 | 56.75 |
| 8 | −13.77877 | 0.7000 | | |
| 9 | Diaphragm | D1 | | |
| 10 | −48.27016 | 2.7500 | 1.73361 | 34.15 |
| 11 | −14.31991 | 1.9421 | | |
| 12* | −11.29668 | 0.8000 | 1.83500 | 42.98 |
| 13 | −24.27405 | 1.4120 | | |
| 14 | −13.75348 | 0.8000 | 1.83500 | 42.98 |
| 15 | −150.32928 | D2 | | | where * represent an aspherical surface. Variable distances D1 and D2 range from 10.4871 mm to 2.1896 mm and from 8.1549 mm to 54.0880 mm, respectively, while zooming.

According to the third preferred embodiment of the present invention, the coefficient of the aspherical twelfth lens surface is described by the aspherical coefficients shown in Table 6.

TABLE 6

| | Aspherical Coefficient of the 12th Surface |
|---|---|
| A0 | −0.1757771908458E 0 |
| A1 | 0.3168662529001E − 4 |
| A2 | −0.2276086369473E − 6 |
| A3 | 0.7881860683163E − 9 |
| A4 | 0.8019071244886E − 11 |

FIGS. 7A to 7C and 8A to 8C illustrate aberration characteristics (chromatic aberration, astigmatism and distortion) of the first preferred embodiment, at a wide angle position and a telephoto position, respectively.

Data for a fourth preferred embodiment of the present invention (see FIGS. 1A and 1B) are shown in Table 7, where the viewing angle is 72 degrees, the F number (Fno) ranges from 4.30 to 10.75 and the focal length f ranges from 8.0 mm to 70.0 mm.

TABLE 7

| Surface No. | Radius of Curvature(r) | Distance(d) | Refractive Index(nd) | Abbe Number(ν) |
|---|---|---|---|---|
| 1 | 11.48069 | 1.4500 | 1.71714 | 28.74 |
| 2 | 17.59279 | 1.0651 | | |
| 3 | −15.93420 | 2.6327 | 1.83500 | 42.98 |
| 4 | 8.18269 | 0.0721 | | |
| 5 | 8.34719 | 3.2000 | 1.49700 | 81.61 |
| 6 | −13.71535 | 1.9000 | | |
| 7 | 24.48134 | 3.2000 | 1.56707 | 59.45 |
| 8 | −13.04924 | 0.8000 | | |
| 9 | Diaphragm | D1 | | |
| 10 | −51.17139 | 2.7500 | 1.71778 | 33.86 |
| 11* | −13.89045 | 1.4899 | | |
| 12 | −12.86978 | 0.8000 | 1.85000 | 42.14 |
| 13 | −31.05753 | 1.9636 | | |
| 14 | −12.13531 | 0.8000 | 1.83500 | 42.98 |
| 15 | −86.92491 | D2 | | | where * represent an aspherical surface. Variable distances D1 and D2 range from 9.6388 mm to 2.1909 mm and from 8.1479 mm to 47.4168 mm, respectively, while zooming.

According to the fourth preferred embodiment of the present invention, the coefficient of the aspherical eleventh lens surface is described by the aspherical coefficients shown in Table 2.

TABLE 8

| | Aspherical Coefficient of the 11th Surface |
|---|---|
| A0 | −0.1979760358459E 0 |
| A1 | −0.3180115265419E − 4 |
| A2 | 0.4918745693776E − 6 |
| A3 | −0.5888868149705E − 8 |
| A4 | 0.3780920882816E − 10 |

FIGS. 9A to 9C and 10A to 10C illustrate aberration characteristics (chromatic aberration, astigmatism and distortion) of the first preferred embodiment, at a wide angle position and a telephoto position, respectively.

Data for a fifth preferred embodiment of the present invention (see FIGS. 1A and 1B) are shown in Table 9, where the viewing angle is 72 degrees, the F number (Fno) ranges from 4.17 to 11.14 and the focal length f ranges from 29.0 mm to 77.5 mm.

TABLE 9

| Surface No. | Radius of Curvature(r) | Distance(d) | Refractive Index(nd) | Abbe Number(υ) |
|---|---|---|---|---|
| 1 | 11.89700 | 1.4500 | 1.67369 | 31.34 |
| 2 | 19.28079 | 1.1186 | | |
| 3 | −16.24711 | 2.7500 | 1.83500 | 42.98 |
| 4 | 8.65286 | 0.0248 | | |
| 5 | 8.65286 | 3.2000 | 1.49700 | 81.61 |
| 6 | −14.82913 | 1.9000 | | |
| 7 | 25.29299 | 3.2000 | 1.56772 | 53.91 |
| 8 | −13.63071 | 0.8000 | | |
| 9 | Diaphragm | D1 | | |
| 10 | −57.11338 | 2.7500 | 1.78278 | 35.69 |
| 11* | −15.84022 | 1.9238 | | |
| 12 | −11.72657 | 0.8000 | 1.85000 | 42.14 |
| 13 | −25.74903 | 1.3969 | | |
| 14 | −14.46646 | 0.8000 | 1.83500 | 42.98 |
| 15 | −156.19748 | D2 | | | where * represent an aspherical surface. Variable distances D1 and D2 range from 10.9868 mm to 2.1856 mm and from 8.1519 mm to 54.4143 mm, respectively, while zooming.

According to the fifth preferred embodiment of the present invention, the coefficient of the aspherical eleventh lens surface is described by the aspherical coefficients shown in Table 10.

TABLE 10

| | Aspherical Coefficient of the 11th Surface |
|---|---|
| A1 | −0.8526520691819E − 1 |
| A1 | −0.4176057886565E − 4 |
| A2 | 0.3222316115856E − 6 |
| A3 | −0.5990036891049E − 8 |
| A4 | 0.2499524715945E − 10 |

FIGS. 11A to 11C and 12A to 12C illustrate aberration characteristics (chromatic aberration, astigmatism and distortion) of the first preferred embodiment, at a wide angle position and a telephoto position, respectively.

The parameters of the condition (1) to (10) for the above embodiments are described in Table 11.

TABLE 11

| Parameter | First Embodiment | Second Embodiment | Third Embodiment | Fourth Embodiment | Fifth Embodiment |
|---|---|---|---|---|---|
| fl/ft | 0.267 | 0.266 | 0.263 | 0.275 | 0.267 |
| ft/fw | 2.672 | 2.672 | 2.672 | 2.500 | 2.672 |
| Ll1/(ft − fw) | 0.771 | 0.771 | 0.755 | 0.758 | 0.772 |
| fl/Y | 0.957 | 0.954 | 0.942 | 0.891 | 0.956 |
| Lw/fw | 1.426 | 1.417 | 1.414 | 1.425 | 1.423 |
| fl/fbw | 2.540 | 2.533 | 2.498 | 2.366 | 2.537 |
| fl/fw | 0.714 | 0.712 | 0.702 | 0.689 | 0.713 |
| ft/f5 | 2.871 | 3.029 | 2.888 | 2.716 | 2.849 |
| βt | 3.743 | 3.754 | 3.804 | 6.631 | 3.748 |
| Lt/ft | 1.016 | 1.013 | 1.002 | 1.025 | 1.016 |

It will be apparent to those skilled in the art that various modifications and variations can be made to the system of the present invention without departing from the spirit and scope of the invention. The present invention covers the modifications and variations of this invention provided they come within the scope of the appended claims and their equivalents.

What is claimed is:

1. A zoom lens system for a camera comprising when counted from an object side:

a first lens group of a positive refractive power which comprises:
a first lens of a positive refractive power which is a meniscus lens convex toward an object;
a second lens of a negative refractive power which is a double concave lens;
a third lens of a positive refractive power which is a double convex lens; and
a fourth lens of a positive refractive power which is a double convex lens; and a second lens group of a negative refractive power which comprises:
a fifth lens of a positive refractive power which is a meniscus lens convex toward an image plane;
a sixth lens of a negative refractive power which is a meniscus lens convex toward the image plane; and
a seventh lens of a negative refractive power which is a meniscus lens convex toward the image plane, wherein the second lens group comprises one aspherical lens surface, and the zoom lens system satisfies the following conditions:

$0.22 < fl/ft < 0.30$ $2.45 < ft/fw$ $0.74 < Ll1/(ft-fw) < 0.85$ $0.75 < fl/Y < 1.10$ $1.30 < Lw/fw < 1.50$ where
fl is a focal length of a first lens group;
ft is a focal length of the entire zoom lens system at a telephoto position;
fw is a focal length of the entire zoom lens system at a wide angle position;
Ll1 is a shift distance of the first lens group during zooming;
2Y is a diagonal length of an image; and
Lw is a distance along an optical axis between an entrance surface of the first lens and an image plane at a wide angle position.

2. A zoom lens system as recited in claim 1, further satisfying the following condition:

$$2.30 < f1/fbw < 2.60$$

where fbw is a back focal length of the entire zoom lens system at a wide angle position.

3. A zoom lens system as recited in claim 1, further satisfying the following condition:

$$0.67 < f1/fw < 0.73.$$

4. A zoom lens system as recited in claim 1, further satisfying the following condition:

$$2.50 < ft/f5 < 3.10$$

where f5 is a focal length of the fifth lens.

5. A zoom lens system as recited in claim 1, further satisfying the following condition:

$$3.3 < \beta t < 4.0$$

where βt is a lateral magnification of the second lens group at a telephoto position.

6. A zoom lens system as recited in claim 1, further satisfying the following condition:

$$0.90 < Lt/ft < 1.10$$

where Lt is a distance along an optical axis between an entrance surface of the first lens and an image plane at a telephoto position.

7. A zoom lens system as recited in any of claims 1, 2–6, further comprising:

a diaphragm located between said first lens group and said second lens group.

8. A zoom lens system as recited in any of claims 1, 2–6, wherein said second lens and said third lens are attached together.

9. A zoom lens system as recited in claim 8, further comprising;

a diaphragm located between said first lens group and said second lens group.

10. A zoom lens system as recited in claim 1, further satisfying the following condition:

$$\theta > 70°$$

where θ is a viewing angle of the zoom lens system in degrees.

* * * * *